(12) United States Patent
Ding et al.

(10) Patent No.: US 9,432,482 B2
(45) Date of Patent: Aug. 30, 2016

(54) ASYNCHRONOUS AND SYNCHRONOUS RESOURCE LINKS

(75) Inventors: Zhongli Ding, Mountain View, CA (US); Dragan Zivkovic, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 986 days.

(21) Appl. No.: 13/222,941

(22) Filed: Aug. 31, 2011

(65) Prior Publication Data

US 2015/0172150 A1    Jun. 18, 2015

(51) Int. Cl.
| | |
|---|---|
| G06F 15/173 | (2006.01) |
| H04L 29/06 | (2006.01) |
| H04L 29/08 | (2006.01) |
| G06F 17/30 | (2006.01) |
| H04L 12/26 | (2006.01) |

(52) U.S. Cl.
CPC .......... *H04L 67/42* (2013.01); *G06F 17/30861* (2013.01); *H04L 67/02* (2013.01); *H04L 67/22* (2013.01); *H04L 43/10* (2013.01)

(58) Field of Classification Search
CPC .. H04L 12/2602; H04L 67/22; H04L 43/0817
USPC .......................... 709/224, 203, 200, 226, 248
See application file for complete search history.

(56) References Cited

U.S. PATENT DOCUMENTS

| | | | |
|---|---|---|---|
| 5,796,952 A * | 8/1998 | Davis et al. .................... | 709/224 |
| 6,859,833 B2 | 2/2005 | Kirsch et al. ................... | 709/224 |
| 7,367,508 B2 | 5/2008 | Christian .................. | 235/462.01 |
| 7,409,422 B2 | 8/2008 | Christian et al. ............... | 709/203 |
| 7,502,994 B2 | 3/2009 | Kocol ........................... | 715/205 |
| 7,698,311 B2 | 4/2010 | Stevenson et al. ............ | 707/602 |
| 2004/0215715 A1 | 10/2004 | Ehrich et al. | |
| 2007/0256003 A1 | 11/2007 | Wagoner et al. | |
| 2008/0046562 A1 * | 2/2008 | Butler ............................ | 709/224 |
| 2008/0162257 A1 * | 7/2008 | Garg et al. ...................... | 705/10 |
| 2008/0178073 A1 | 7/2008 | Gao et al. | |
| 2008/0195665 A1 * | 8/2008 | Mason et al. .............. | 707/104.1 |
| 2008/0235085 A1 | 9/2008 | Kovinsky et al. | |
| 2008/0270412 A1 | 10/2008 | Udayasankar et al. ......... | 707/10 |
| 2009/0265460 A1 * | 10/2009 | Balasubramanian et al. | 709/224 |

(Continued)

OTHER PUBLICATIONS

Lee Barney (Using Enterprise Synchronization, Dec. 29, 2009, http://quickconnect.pbworks.com/w/page/10304137/UsingEnterpriseSynchronization, retrieved on Nov. 2, 2012).

(Continued)

*Primary Examiner* — El Hadji Sall
(74) *Attorney, Agent, or Firm* — Fish & Richardson P.C.

(57) ABSTRACT

Methods, systems, and apparatus, including computer programs encoded on a computer storage medium, for providing asynchronous and synchronous links to resources. According to one example implementation, a method includes receiving a request for a resource, identifying resources to be referenced by the requested resource, and identifying one or more of the referenced resources that are associated with client-side click tracking, and one or more of the referenced resources that are associated with server-side click tracking. The method also includes providing the requested resource. The provided resource includes one or more client-side click tracking links to the referenced resources that are associated with client-side click tracking, and one or more server-side click tracking links to the referenced resources that are associated with server-side click tracking.

35 Claims, 7 Drawing Sheets

(56) References Cited

U.S. PATENT DOCUMENTS

| | | | |
|---|---|---|---|
| 2010/0030792 A1* | 2/2010 | Swinton et al. | 707/100 |
| 2010/0287566 A1 | 11/2010 | Hauser | |
| 2010/0325419 A1 | 12/2010 | Kanekar | |
| 2010/0332550 A1 | 12/2010 | Ainslie | |
| 2011/0093619 A1 | 4/2011 | Nelson | |
| 2011/0185016 A1* | 7/2011 | Kandasamy et al. | 709/203 |
| 2011/0314092 A1 | 12/2011 | Lunt et al. | |
| 2012/0254892 A1 | 10/2012 | Grabowski | |
| 2012/0272338 A1 | 10/2012 | Falkenburg et al. | |
| 2014/0012941 A1* | 1/2014 | Smith et al. | 709/217 |

OTHER PUBLICATIONS

Office Action issued in U.S. Appl. No. 13/194,875 on Nov. 20, 2012, 19 pages.

Office Action issued in U.S. Appl. No. 13/194,875 on Mar. 29, 2013, 21 pages.

CSS Pseudo-Classes, [online], [retrieved on Nov. 24, 2009]. Retrieved from the Internet <URL: http://www.w3schools.com/CSS/css_pseudo_classes.asp>, 4 pages.

Tizag, "CSS Tutorial—Pseudo Class & Mouseover." [online], [retrieved on Nov. 24, 2009]. Retrieved from the Internet <URL: http://www.tizag.com/cssT/pclass.php>, 3 pages.

Wikipedia, "Cascading Style Sheets." [online], [retrieved on Nov. 24, 2009]. Retrieved from the Internet <URL: http://en.wikipedia.org/wiki/Cascading_Style_Sheets>, 12 pages.

Wikipedia, "Markup Language." [online], [retrieved on Nov. 24, 2009]. Retrieved from the Internet <URL: http://en.wikipedia.org/wiki/Markup_language>, 7 pages.

Wikipedia, "Style Sheet Language." [online], [retrieved on Nov. 24, 2009]. Retrieved from the Internet <URL: http://en.wikipedia.org/wiki/Style_sheet_language>, 2 pages.

Office Action issued in U.S. Appl. No. 12/625,424 on Apr. 4, 2011, 30 pages.

Office Action issued in U.S. Appl. No. 12/625,424 on Nov. 16, 2011, 23 pages.

Notice of Allowance issued in U.S. Appl. No. 12/625,424 on May 7, 2012, 12 pages.

Notice of Allowance issued in U.S. Appl. No. 12/625,424 on May 22, 2013, 6 pages.

* cited by examiner

ASYNCHRONOUS AND SYNCHRONOUS RESOURCE LINKS

BACKGROUND

The present specification relates to providing web resources.

Web site users can navigate to, or otherwise interact with, web pages by selecting (or "clicking") links and other controls. Information about user-selected links can be used by web site managers and web hosts to gain insight into user behavior.

Various techniques are used to track user clicks. Some systems use web logs to log click tracking parameters while processing user actions. Other systems use Uniform Resource Locator (URL) redirects to direct a user to an intermediary resource where clicks are logged, before directing the user to his or her intended destination. Other systems make AJAX requests to send click tracking information before performing the user's intended action. Other systems ping a click tracking server asynchronously by creating a fake image object with the source set to a click tracking URL.

SUMMARY

According to one innovative aspect of the subject matter described in this specification, a web server generates or modifies a web page to include links that are configured for client-side click tracking, and links that are configured for server-side click tracking. The web server may determine to generate a link that is configured for client-side click tracking based on evaluating properties of a resource that is referenced by the link. In one instance, the web server may evaluate a resource that is referenced by a link to determine whether the reference includes client-side click tracking code and, if so, the web server may modify the link to be configured for client-side click tracking.

Another innovative aspect of the subject matter described in this specification, a method includes receiving a request for a resource, identifying resources to be referenced by the requested resource, and identifying one or more of the referenced resources that are associated with client-side click tracking, and one or more of the referenced resources that are associated with server-side click tracking. The method also includes providing the requested resource. The provided resource includes one or more client-side click tracking links to the referenced resources that are associated with client-side click tracking, and one or more server-side click tracking links to the referenced resources that are associated with server-side click tracking.

Other embodiments of these aspects include corresponding systems, apparatus, and computer programs, configured to perform the actions of the methods, encoded on computer storage devices.

These and other embodiments may each optionally include one or more of the following features. For instance, identifying the one or more referenced resources that are associated with client-side click tracking, and one or more of the referenced resources that are associated with server-side click tracking includes identifying one or more of the referenced resources that are included on a client-side click tracking whitelist or blacklist; identifying the one or more referenced resources that are associated with client-side click tracking, and one or more of the referenced resources that are associated with server-side click tracking includes evaluating links to referenced resources that are included in the requested resource before the requested resource is modified; identifying the one or more referenced resources that are associated with client-side click tracking, and one or more of the referenced resources that are associated with server-side click tracking includes identifying one or more servers that are associated with the referenced resources; identifying the one or more referenced resources that are associated with client-side click tracking, and one or more of the referenced resources that are associated with server-side click tracking includes receiving one or more user inputs that identify one or more of the referenced resources as resources that are associated with client-side click tracking, or as resources that are associated with server-side click tracking; identifying the one or more referenced resources that are associated with client-side click tracking, and one or more of the referenced resources that are associated with server-side click tracking includes, for each of the referenced resources, determining whether the referenced resource includes local storage monitoring code; identifying the one or more referenced resources that are associated with client-side click tracking, and one or more of the referenced resources that are associated with server-side click tracking includes determining a type of the device that requested the resource; identifying the one or more referenced resources that are associated with client-side click tracking, and one or more of the referenced resources that are associated with server-side click tracking includes, after receiving the request, navigating to the referenced resources to obtain the content of the referenced resources, and evaluating the content of each of the referenced resources; identifying the one or more referenced resources that are associated with client-side click tracking, and one or more of the referenced resources that are associated with server-side click tracking includes, for each referenced resource, determining whether the referenced resource references an application that is local to a device that is requesting the resource; the method includes, for each of the referenced resources that are associated with client-side click tracking, determining that the referenced resource is associated with synchronous client-side click tracking or asynchronous client-side click tracking, where the client-side click tracking links to each of the referenced resources that are associated with client-side click tracking each include a flag that specifies whether the respective referenced resource is associated with synchronous client-side click tracking or asynchronous client-side click tracking; identifying the one or more referenced resources that are associated with server-side click tracking includes identifying one or more of the referenced resources that are not associated with client-side click tracking; providing the requested resource includes generating the requested resource to include the client-side click tracking links to the referenced resources that are associated with client-side click tracking, and the server-side click tracking links to the referenced resources that are associated with server-side click tracking; and/or providing the requested resource includes modifying the requested resource to include the client-side click tracking links to the referenced resources that are associated with client-side click tracking, and the server-side click tracking links to the referenced resources that are associated with server-side click tracking.

Advantageous implementations may include one or more of the following features. When a user interacts with a resource (e.g., a web page of a web site), information related to resource usage may be logged and reported asynchronously, without impacting performance of the navigation to the resource. When the user navigates to a different resource (e.g., a web page of the same or a different website), resource usage information may be provided synchronously, ensuring that such information is not lost and that the information may be processed in a timely manner. Information regarding selections may be preserved in situations in which users may attempt to navigate away from a resource, or in which an application for presenting the resource (e.g., a web browser) may crash. A separation of code between tracking and reporting resource usage information may be maintained, potentially simplifying the process of integrating reporting mechanisms. An automated process may classify referenced resources and generate appropriate click tracking links to the resources based on the classification and/or on the user's type of device, simplifying development while enhancing usability. Suitable click tracking techniques may be determined and implemented dynamically.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
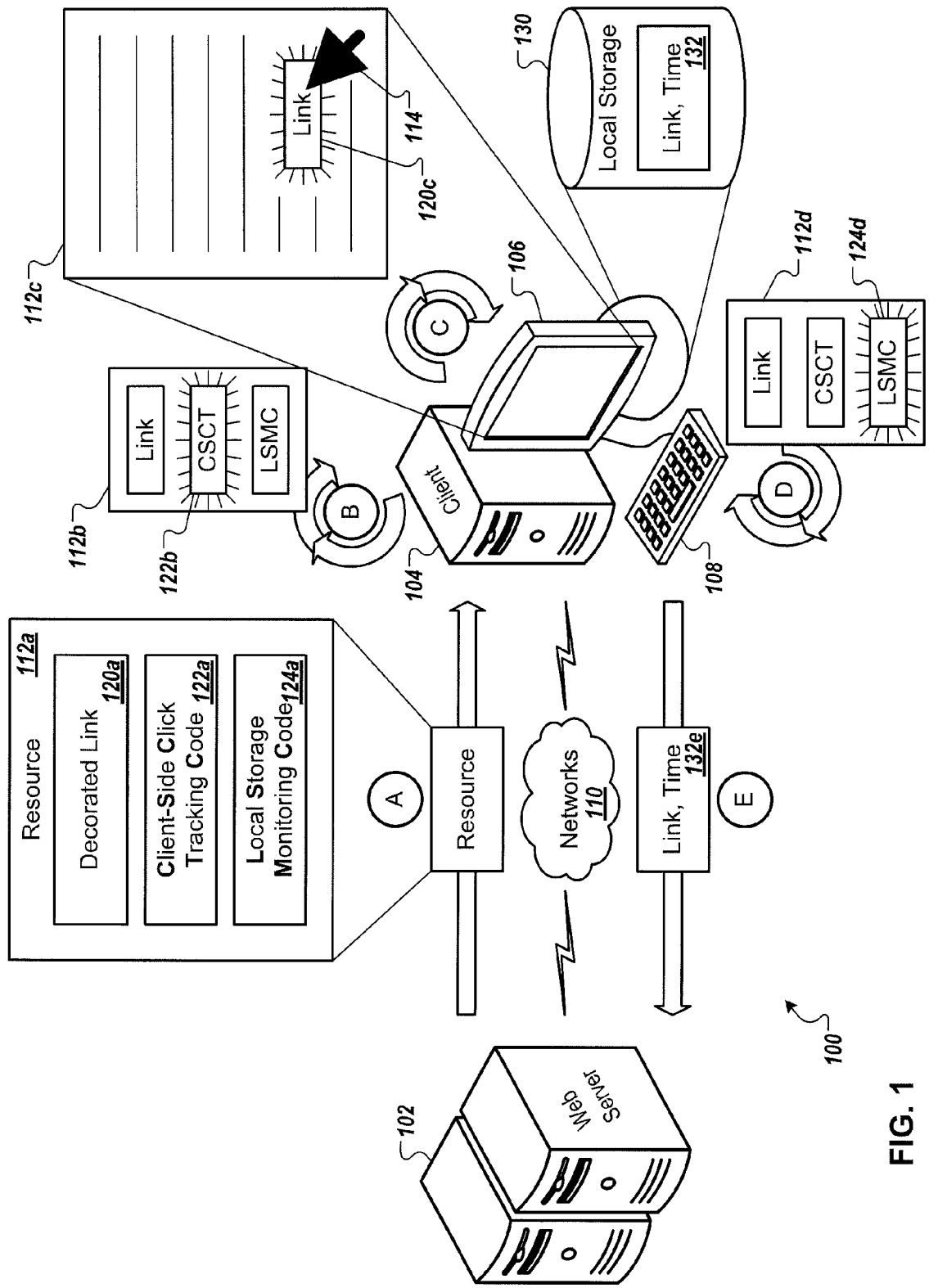
FIG. 1 is a diagram of an example system that may provide link selection information.

FIG. 1 is a diagram of an example system 100 that may provide link selection information. FIG. 1 also illustrates an example flow of data, shown in states (A) to (E). States (A) to (E) may occur in the illustrated sequence, or they may occur in a sequence that is different than in the illustrated sequence. For example, states (B), (C), and (E), may run concurrently in some implementations.

In general, the system 100 may capture various user actions, including intra-page selections (e.g., via widgets, phone dialers, etc.), navigation to different pages within a web site, and navigation to pages of external web sites. Information associated with selection events (e.g., link clicks) can be stored locally (e.g., by a web browser), can be accumulated, and can be provided (e.g., to a web server) periodically or upon the occurrence of particular user actions.

To facilitate the handling, tracking, and reporting of selection events, web links can include attributes that indicate whether the links are associated with web pages or other resources internal to or external to a particular web site. If a link associated with a web page internal to the web site is clicked by a user, for example, information related to the link selection may be stored locally by a web browser and may be accumulated with information associated with other user actions.

Periodically, e.g., based on a timer, the locally stored information may be provided by the web browser to a web server hosting the web site, or to a web server that tracks selection information. If a link associated with a web page external to the web site is clicked by the user, for example, information related to the link selection and any additional locally stored user activity information may be provided to the web server.

Thus, while the user interacts with the web site, information related to web site usage may be logged and reported asynchronously, without impacting web site performance. As the user navigates to a different web site, for example, site usage information may be provided synchronously, ensuring that web site usage information is not lost and that the information may be used by web site managers and web hosts in a timely manner.

User activity information (e.g., link clicks) can be used by web site managers and web hosts, for example, as a factor in designing and providing web pages to users. For example, links that receive a high number of clicks may be prominently placed within a web page. For situations in which the systems discussed here collect personal information (e.g., user activity) about individuals, the individuals may be provided with an opportunity to opt in or opt out of programs or features that may collect the personal information. In addition, certain data may be anonymized in one or more ways before it is stored or used, so that personally identifiable information is removed.

In further detail, the system 100 includes a web server 102 and a client computing device 104 in communication over one or more networks 110. The client computing device 104 can receive a resource 112a, e.g., a web page, an application, or a control internal or external to a web site, from the web server 102 and can present information associated with the resource 112a to a user via a display device 106, e.g., a monitor displaying a web browser. The user can employ an input device 108 such as a keyboard, a mouse, a touch screen or another sort of input device to interact with the resource, and information associated with the interaction can be provided by the client computing device 104 to the web server 102 via the networks 110.

The web server 102 may include one or more servers, e.g., a cloud computing server, a server farm, or another server arrangement including one or more processors configured to execute instructions stored by a computer-readable medium for performing various server operations. In the present example, the web server 102 may be configured to host one or more web sites, to provide web site pages to users, and to receive and process information associated with user interactions (e.g., link clicks, etc.) with web pages.

The client computing device 104 may be a smart phone, a tablet computer, a notebook computer, a laptop computer, a desktop computer or any other appropriate portable or stationary computing device. The client computing device 104 may include one or more processors configured to execute instructions stored by a computer-readable medium for performing various client operations, such as input/output, communication, data processing, and the like. For example, the client computing device 104 can include or communicate with the display device 106, (e.g., a monitor) to present information associated with a web page resource to a user. The user, for example, can employ the input device 108 (e.g., a keyboard, a mouse, a touch screen, etc.) included in or in communication with the client computing device 104 to control a selection cursor 114 to interact with the web page resource.

The networks 110 connecting the client computing device 104 and the web server 102 may be wired or wireless, and may include a packet-based network, such as a TCP-IP network. The networks 110 may include a local area network such as an intranet, a wide area network, the Internet, or any appropriate combination thereof.

Referring to the example data flow, during state (A), the client computing device 104 receives the resource 112a (e.g., a web page) from the web server 102 via the networks 110. For example, a user of the client computing device 104 may employ a web browser to navigate to a web page of a web site hosted by the web server 102. The resource 112a can include a decorated link 120a augmented with one or more attributes or flags, client-side click tracking code 122a, and local storage monitoring code 124a.

The decorated link 120a may be specified upon generating the resource 112a, for example, and may include declarative information used to augment or modify handling of the link. For example, when constructing a visual element such as a widget that shows, hides, expands, or collapses other page elements, a phone number link, an intra-page link, a link from one page to another within a web site, a link to a page of an external web site, or another sort of visual element with which a user may interact, a developer and/or an automated process can determine whether or not user interactions with the visual element are to be tracked, and which mechanism are to be used for tracking. A web page may include multiple links, for example, each decorated with one or more attributes to be used by a web browser to implement various click tracking techniques.

The client-side click tracking code 122a and the local storage monitoring code 124a may include code (e.g., JavaScript) that can be executed by a web browser. Upon receiving the resource 112a, for example, a web browser executed by the client computing device 104 can initialize the resource 112a and can register one or more event listeners for the resource 112a. An event listener may be registered for the client-side click tracking code 122a, for example, and the code may be run within a corresponding web browser event handler. In addition, a timer (e.g., an interval) may be scheduled for the local storage monitoring code 124a. Based on the timer, for example, the web browser can trigger the local storage monitoring code 124a to process locally stored selection event information.

During state (B), the client computing device 104 runs the client-side click tracking code 122a, here shown as client-side click tracking code 122b, associated with the resource 112a, here shown as resource 112b. For example, a web browser executed by the client computing device 104 can include an event handler that continually monitors for events triggered by actions, such as selections, clicks, hovers, swipes, drags, and other user actions while interacting with the resource 112b (e.g., a web page).

During state (C), the client computing device 104 detects a selection of the decorated link 120a, here shown as decorated link 120c, included in the resource 112a, here shown as resource 112c. For example, a user can employ the input device 108 and the display device 106 of the client computing device 104 to control the selection cursor 114 and to interact with the resource 112 (e.g., a web page). Upon the user clicking a visual representation such as a control, a link or block of text, an image, a video, or another visual representation of the decorated link 120c, for example, a web browser presenting the web page can detect the click, and can run the client-side click tracking code 122a.

In the present example, the client computing device 104 may determine that information associated with user interactions with the decorated link 120c is to be stored locally. For example, based on one or more attributes or flags of the decorated link 120c, a web browser executed by the client computing device 104 may store user activity information 132 such as link and timestamp information in local storage 130, e.g., HTML5 Local Storage. The decorated link 120c, for example, may be an intra-page link, such as a link for expanding or collapsing a section of a web page, or for directing a user to a different page section. As another example, the decorated link 120c may be a link to a phone dialer or another such utility. As the user in the present example employs various web page features without attempting to exit the web page, user activity information may be collected and accumulated in the location storage 130.

During state (D), the client computing device 104 runs the local storage monitoring code 124a, here shown as local storage monitoring code 124d, associated with the resource 112a, here shown as resource 112d. For example, the local storage monitoring code 124d can be triggered by a timer maintained by a web browser executed by the client computing device 104. Upon a particular time interval such as a fraction of a second, a second, two seconds, five seconds, or another appropriate time interval, for example, the local storage monitoring code 124a may monitor the local storage 130 to identify stored user activity information 132.

During state (E), the client computing device 104 communicates the user activity information 132, here shown as user activity information 132e, to the web server 102 via the networks 110. For example, information related to user interaction with the decorated link 120c such as a link identifier, a time at which the link was interacted with, an identifier of the client computing device 104 employed by the user, a user identifier, an interaction type, and/or other user interaction information can be provided to the web server 102.

Upon receipt of the user activity information 132e, for example, the web server 102 may use the information to perform various processing and logging operations. For example, timestamps associated with user actions may be calibrated to determine correct times and sequences of the actions. User activity information 132e from the client computing device 104 may be logged and used to recreate a user session, for example. As another example, user activity information 132e from multiple client computing devices 104 may be logged and aggregated for use in identifying activity patterns related to web page and web site usage.

Figure 2:
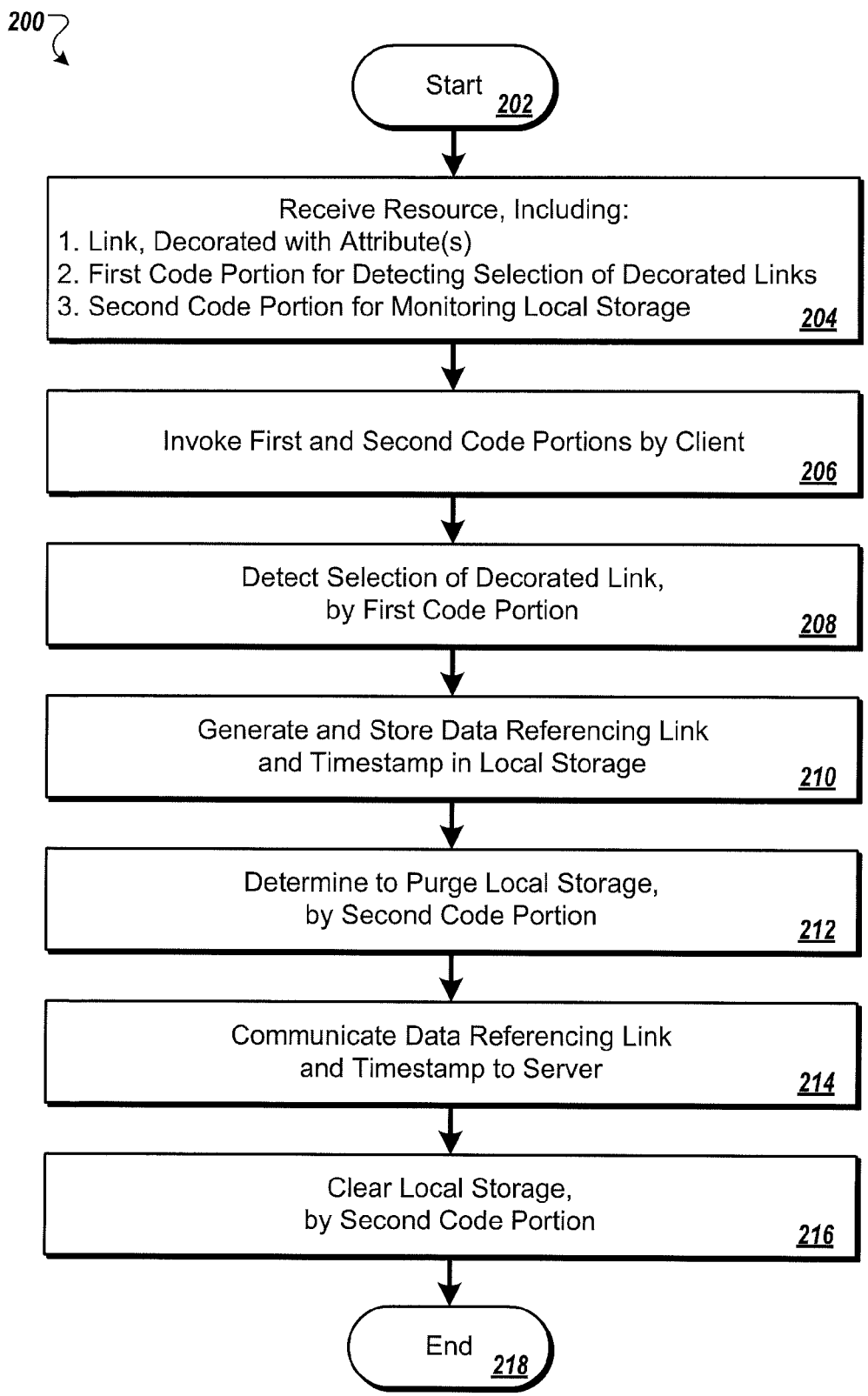
FIG. 2 is a flow chart illustrating an example process for detecting link selection and providing link selection information.

FIG. 2 is a flow chart illustrating an example process 200 for detecting link selection and providing link selection information. Briefly, the process 200 includes receiving a resource including a decorated link, code for detecting the selection of decorated links, and code for monitoring local storage. The code for detecting the selection of decorated links and the code for monitoring local storage are invoked by the client. Selection of the decorated link is detected, and data referencing the link selection is stored locally. A determination to purge the local storage is made by the code monitoring local storage, data referencing the link selection is communicated to a server, and the local code storage is cleared.

In more detail, when the process 200 begins (202), a resource is received (204). Referring to FIG. 1, for example, the client computing device 104 can receive the resource 112, e.g., a web page, from the web server 102 via the networks 110. The resource can include one or more links, each decorated with one or more attributes, a first code portion for detecting selection of the decorated links, and a second code portion for monitoring local storage. In the present example, the resource 112 includes the decorated link 120, the client-side click tracking code 122, and the local storage monitoring code 124.

In some implementations, a web page developer may specify whether user interaction with a link is to be tracked, and may also indicate an appropriate mechanism to be used for tracking. For example, the developer of a web page may assign an enumerated value to a particular link included on the web page, indicating a preferred click tracking option such as "none", "redirection", "client-side asynchronous tracking", "client-side synchronous tracking", and other suitable tracking options.

In the present example, a post processor, e.g., executed by the web server 102, can process the web page, considering tracking mechanisms applicable to the assigned option and/or the client runtime environment. For example, the post processor can compare a destination Uniform Resource Locator (URL) of a web link against a whitelist of web sites that may support asynchronous click tracking. As another example, the post processor can determine whether the client computing device 104 supports code, e.g., JavaScript that may be used to facilitate certain forms of click tracking. Upon post processing, for example, the web server 102 can provide a version of the resource 112, e.g., the web page, with versions of the decorated link 120, the client-side click tracking code 122, and/or the local storage monitoring code 124 suitable for use by the client computing device 104.

In some implementations, a link may be decorated with one or more client-side click tracking attributes. In the present example, for a particular link, the post processor executed by the web server 102 can consider the click tracking option specified by the web developer and the capabilities of the client computing device 104 to assign one or more attributes to the decorated link 120.

For example, links that are identified as being suitable for client-side click tracking may be decorated with a click tracking Uniform Resource Locator string. As another example, links that are identified as being suitable for synchronous or asynchronous click-tracking may be decorated with a synchronization flag. Such client-side click tracking attributes may be rendered as HyperText Markup Language (HTML) tags usable by JavaScript code executed on the client computing device 104, for example.

The first and second code portions are invoked (206) by the client. For example, the client computing device 104 can invoke the client-side click tracking code 122 and the local storage monitoring code 124. In some implementations, an event listener can be registered to listen for a selection of a link that is decorated with the client-side click tracking attribute. For example, a web browser executed by the client computing device 104 can register a click event listener for the capture phase, which may occur before the bubble phase based on JavaScript event ordering. Thus, in the present example, the registered click event listener may be triggered before other web browser event listeners are informed of a particular user action such as a click.

In some implementations, a timer may be configured to periodically trigger local storage monitoring code. For example, the timer may be configured to wake up at predetermined intervals (e.g., a fraction of a second, a second, two seconds, five seconds, etc.) and to trigger the local storage monitoring code 124. In some implementations, the predetermined interval may be configurable. For example, an interval value may be provided by the web server 102 to the client computing device 104 as a property of the resource 112. Different client devices and different runtime environments may be provided with different interval values, for example, based on capabilities of the devices, network connections and/or runtime environments.

Selection of the decorated link is detected (208) by the first code portion. For example, a user of the resource 112 (e.g., a web page) can select (e.g., click) the decorated link 120. In the present example, the web browser executed by the client computing device 104 can detect the click event associated with the selection of the decorated link 120 via the registered event handler and can run the client-side click tracking code 122.

Data referencing the link and timestamp data are generated and stored (210) in local storage. For example, the client-side click tracking code 122 can generate a serialized representation including identifiers and attributes of the decorated link 120 and can store the representation with a timestamp indicating the time the user clicked the link. The representation, for example, may include a Uniform Resource Identifier (URI) associated with the link. The representation and timestamp can be stored as user activity information 132 in the local storage 130, e.g., HTML5 local storage, for example, along with a value indicating that the stored information is related to client-side click tracking.

In the present example, as additional user interactions with the resource 112 are detected, additional information associated with the interactions can be added to the local storage 130 as user activity information 132. For example, additional link representations and timestamps can be appended to existing representations and timestamps to form a comma-separated list. By storing user activity information, such as information related to click events, as it occurs, the information may be preserved in situations in which a user attempts to navigate away from a web page or web site, or in which a web browser may crash, for example. If a web browser were to crash during the user's session, for example, user activity information 132 stored in local storage 130 may persist, and may be eventually provided to the web server 102 upon the user re-launching the web browser and returning to a web site associated with the resource 112.

Purging of the local storage is determined (212) by the second code portion, and data referencing the link and timestamp is communicated (214) to the server. For example, the local storage monitoring code 124 and/or the client-side click tracking code 122 of the resource 112 can determine whether and when to purge the local storage 130. In some implementations, communicating the representation of the link selection to one or more servers may include purging the representation. For example, the client computing device 104 may communicate the user activity information 132 to the web server 102 and may purge the information from the local storage 130.

In some implementations, communicating the representation of the link selection and purging of the local storage may be based at least in part on the value of a synchronization flag associated with the link. For example, if the decorated link 120 is associated with an attribute indicating client-side click tracking and with a flag indicating asynchronous communication of user activity information, communicating the representation and purging the local storage may be based on determining that a predetermined timer has elapsed. For example, a timer associated with a web browser can periodically trigger the local storage monitoring code 124 to communicate user activity information 132, e.g., link representations and timestamps, stored in local storage 130 to the web server 102. Upon providing the user activity information 132, for example, the local storage 130 may be purged.

However, if the decorated link 120a is associated with a client-side click tracking attribute and with a flag indicating synchronous communication of user activity information, for example, communicating the representation may be performed synchronously to storing the representation of the selection of the link in the local storage. For example, upon the user clicking the decorated link 120, the client-side click tracking code 122 may determine that the link is associated with an attribute indicating client-side click tracking and with a flag indicating synchronous communication of user activity information. In the present example, the client-side click tracking code 122 can add a representation and timestamp associated with the decorated link 120 to the local storage 130 and can communicate the user activity information 132 to the web server 102 without waiting a predetermined period of time after the representation of the link has been stored in the local storage.

In some implementations, communicating the representation may include building a ping URL that includes the representation, and transmitting the ping URL to the one or more servers. For example, to provide the user activity information 132 to the web server 102, an event handler of a web browser executed by the client computing device 104 may add a client ping time to the information, e.g., at the start of a string, may URI encode the information, and may issue an AJAX request to the web server 102.

In some implementations, a ping URL format may include the following format:
/m/url?sa=T&atype=i&ctyp=csct&cad={cad}
In the above format, "cad" represents one or more serialized events in the following format:
clientPingTime, eventTime:cturl, eventTime:cturl[ . . . ]
In the above format, "cturl" represents the click tracking URL, that is, the URL which is being click tracked.

Pings to the server may be synchronous or asynchronous. Synchronous pings, for example, may send user activity information associated with the last triggered event, i.e., an event for which synchronous handling is appropriate, and locally stored user activity information associated with any other events that may have preceded the event. Asynchronous pings, for example, may be triggered by a timer, and may send locally stored user activity information associated with events that may have preceded the elapsing of the timer's time interval.

By reporting some user interactions asynchronously and some synchronously, for example, user activity (e.g., clicks) may be appropriately reported within the context of a user's actions. For example, intra-page or intra-site interactions, e.g., interacting with controls which expand/collapse web page sections, navigating to different sections within a web page, navigating to different web pages within a web site, and other interactions can be accumulated and can be periodically reported in an asynchronous manner, without impacting web page performance. Intra-site interactions, e.g., a user navigating to another site, can be reported synchronously, for example, to ensure that user activity information is reported before the user exits a web site.

Local storage is cleared (216) by the second code portion, thereby ending (218) the process 200. For example, the local storage monitoring code 124 can clear the user activity information 132 from the local storage 130 upon providing the information 132 to the web server 102. In some implementations, the invoked local storage monitoring code may receive an acknowledgement that the representation of the selection of the link has been received by the one or more servers, then may clear the local storage.

For example, after receiving the user activity information 132 from the client computing device 104, the web server 102 can provide an acknowledgement of the receipt of the information 132 to the client computing device 104. Upon receiving the acknowledgement, for example, the local storage monitoring code 124 can purge the local storage 130 of the user activity information 132. Thus, in the present example, the system 100 can ensure the successful transfer of information related to user interactions with the resource 112.

Figure 3A:
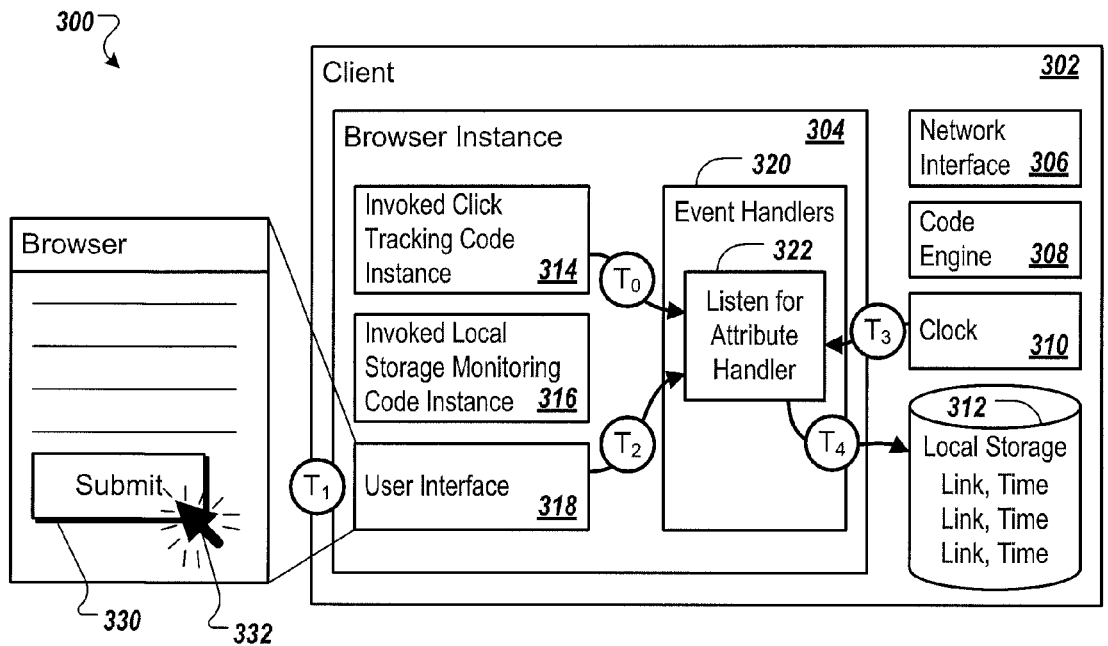
FIGS. 3A-3B are block diagrams of an example system for detecting, storing, and providing link selection information.
Figure 3B:
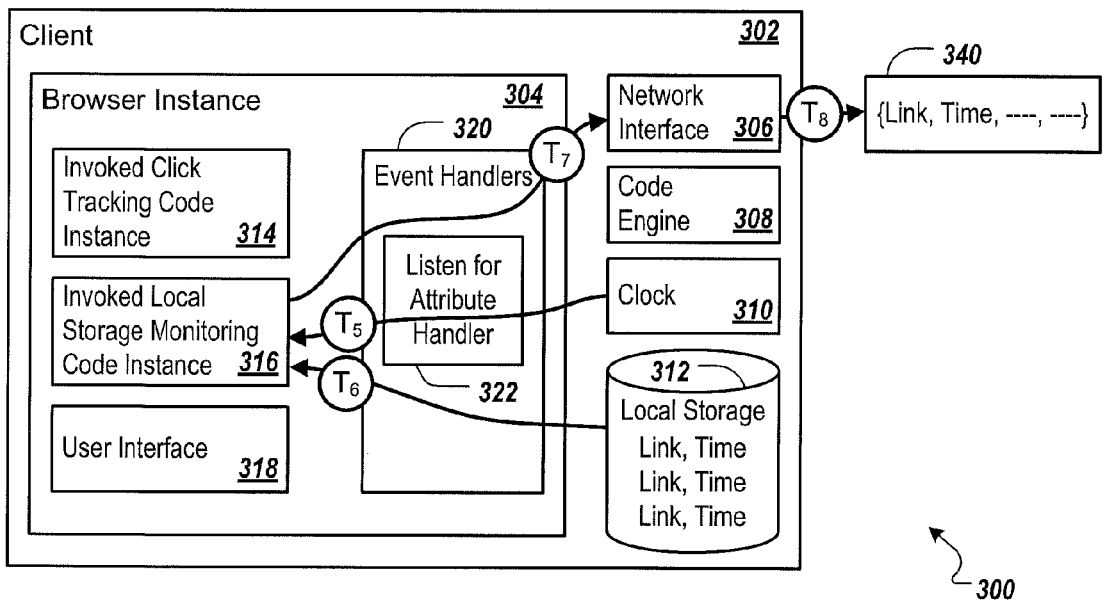

FIGS. 3A-3B are block diagrams of an example system 300 for detecting, storing, and providing link selection information. FIGS. 3A-3B also illustrates an example flow of data, shown in states ($T_0$) to ($T_8$). States ($T_0$) to ($T_8$) may occur in the illustrated sequence, or they may occur in a sequence that is different than in the illustrated sequence.

Referring to FIG. 3A, the system 300 includes a client 302. The client 302 may be a portable or stationary client computing device (e.g., the client computing device 104, shown in FIG. 1), and may include one or more processors configured to execute instructions stored by a computer-readable medium for performing various client operations, such as input/output, communication, data processing, and the like. The client 302 in the present example includes a browser instance 304, e.g., an instance of a web browser, a network interface 306, a code engine 308, a clock 310, and local storage 312.

The browser instance 304, for example, may be an instance of a web browser configured to be executed by the client 302 and/or may be a commercially available web browser. The browser instance 304 can include an invoked click tracking code instance 314, an invoked local storage monitoring code instance 316, and a user interface 318. The invoked click tracking code instance 316, for example, may be configured to detect selections (e.g., clicks) of links included in the user interface 318, to generate representations of the selections, and to store the representations in the local storage 312. The invoked local storage monitoring code instance 316, for example, may be configured to monitor the local storage 312 based on a timer interval periodically triggered by the clock 310. The user interface 318, for example, may include one or more links or controls, e.g., a submit control 330, that may be decorated with one or more attributes to facilitate click tracking.

The network interface 306 can provide communications capabilities for providing data to and receiving data from other computing devices, including computing servers (e.g., the web server 102, shown in FIG. 1) and including other clients over one or more networks (e.g., the networks 110, also shown in FIG. 1). For example, the network interface 306 may employ various communication protocols to receive data, e.g., HTML, JavaScript code, or other suitable data for rendering by the browser instance 304 for presentation to a user via the user interface 318. The network interface 306 may also provide information associated with user interactions with the user interface 318 to the web server 102, for example.

The code engine 308 can be used by the browser instance 304 to run browser code, and to run code (e.g., JavaScript) associated with particular web pages. For example, the invoked click tracking code instance 314 and the invoked local storage monitoring code instance 316 may be associated with JavaScript code that is triggered by one or more event handlers 320. When triggered, for example, such JavaScript code may be run by the code engine 308.

The clock 310 can be a system clock of the client 302. For example, the clock 310 can measure system time as it transpires. Information provided by the clock 310 may be used by timer event handlers associated with the browser instance 304 to detect the passage of time intervals, for example, and may be used to associate user activity events (e.g., clicks) with particular times (e.g., timestamps).

The local storage 312 can be used by the browser instance 304, for example, to store information associated with selections of links included in the user interface 318. In some implementations, the local storage 312 may include HTML5 local storage. For example, the local storage 312 may store key/value pairs including information associated with selected links, and timestamps of when the selections occurred. The local storage 312 may be associated with a particular web page, for example, or may be associated with multiple web pages within a web site, and may persist between web browsing sessions. For example, if the browser instance 304 were to terminate, e.g., upon closing by a user or upon crashing, the local storage 312 may persist on the client 302 and may be accessible by the web page/site when the user returns.

Referring to the example data flow, during state ($T_0$), the invoked click tracking code instance 314 is registered with the event handlers 320 in association with a listen for attribute handler 322. In the present example, the listen for attribute handler 322 can be associated with a capture-phase event listener which listens for selections of links and other controls (e.g., the submit control 330) that are decorated with a client-side click tracking attribute. During state ($T_1$), a user can employ a selection cursor 332 to interact with the user interface 318 and to select the submit control 330. For example, the user may employ a user input device (e.g., a keyboard, a mouse, a touch screen, etc.) to click the submit control 330 to submit data entered on web form to a web server.

During state ($T_2$), the listen for attribute handler 322 detects selection, e.g., the user click, of the submit control 330. In the present example, the invoked click tracking code instance 314 triggered by the handler 322 can generate a representation, e.g., a representation including a Uniform Resource Identifier, of the selection, and can store the representation with associated information, including timestamp information that specifies the time of the selection. During state ($T_3$), the handler 322 receives the current time from the clock 310, and generates a timestamp for when the submit control 330 was clicked by the user. The handler 322, for example, can serialize and concatenate the representation and timestamp information. During state ($T_4$), the representation and timestamp information are stored in local storage 312. For example, the representation and timestamp information associated with the click of the submit control 330 can be appended to information associated with preceding events.

Referring to FIG. 3B, during state ($T_5$), a timer event associated with the clock 310 triggers the invoked local storage monitoring code instance 316. For example, a predetermined time interval (e.g., a fraction of a second, a second, two seconds, five seconds, etc.) may have elapsed, triggering the local storage monitoring code instance 316 to determine whether locally stored representations of link selections may be communicated to the server. As another example, the invoked local storage monitoring code 316 may be triggered without waiting for the time interval to elapse. For example, if the submit control 330 is associated with a flag indicating that selection of the control 330 is to be communicated synchronously, the locally stored representation of the selection, and any preceding selections that may persist in the local storage 312, may be communicated upon storing the representation and timestamp information (e.g., during state ($T_4$)).

In some implementations, the determination of whether to communicate locally stored information may be made at regular intervals. For example, the local storage monitoring code instance 316 may be triggered every five seconds, or some other such interval. In some implementations, the determination of whether to communicate locally stored information may be based in part user activity. For example, upon storing the representation and timestamp information, e.g., during state ($T_4$), an event timer may be reset. Upon the timer elapsing after having been reset, i.e., if the user is inactive for a predetermined time interval, the timer may trigger the invoked local storage monitoring code instance 316.

During state ($T_6$), the invoked local storage monitoring code 316 identifies one or more representations/timestamps of link selections in the local storage 312. The invoked local storage monitoring code 316, for example, can retrieve the stored representation/timestamp information from the local storage 312, append a client ping time to the information, URI-encode the information, and generate a ping URL including the information. During state ($T_7$), the local storage monitoring code 316 communicates the retrieved representation/timestamp information. For example, the local storage monitoring code 316 may communicate the information synchronously or asynchronously, depending a synchronization flag that may be attributed to the submit control 330. During state (T8), a packet 340 of information (e.g., the ping URL) including the representation/timestamp information is communicated via the network interface 306. For example, the packet 340 may be provided to one or more web servers for recreating the user's web browsing session.

As described in the example above, a separation of code may be maintained between tracking and reporting user activity information. For example, user activity may be tracked on the client 302 using the invoked click tracking code instance 314, and may be reported to one or more servers using the invoked local storage monitoring code instance 316. Thus, in the present example, if additional or other mechanisms for reporting user activity were to be identified, implementation of such mechanisms could be readily integrated within the system 300.

Figure 4:
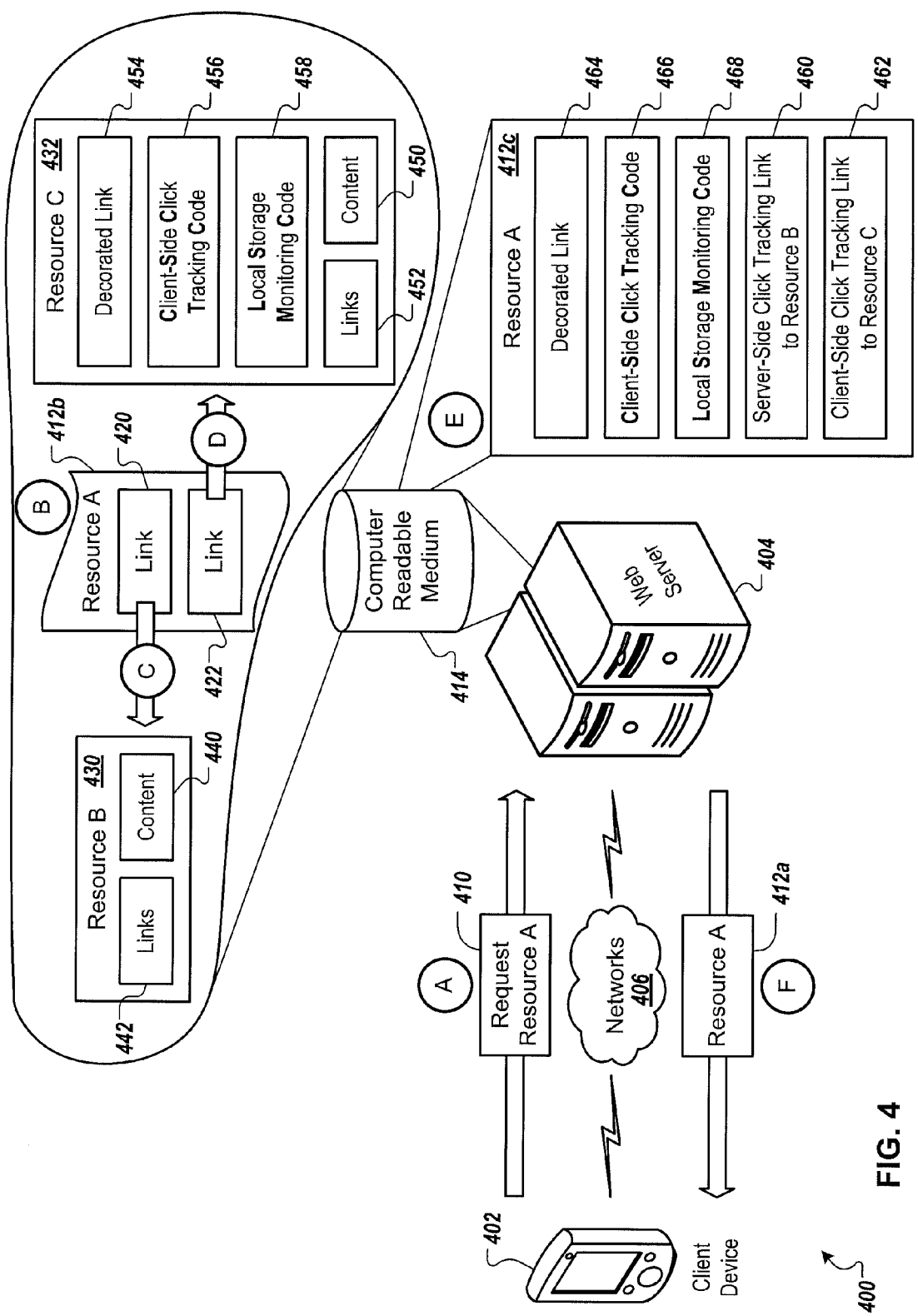
FIG. 4 is a diagram of an example system that may generate or modify requested resources to include client-side and server-side click tracking links.

FIG. 4 is a diagram of an example system 400 that may generate or modify requested resources to include client-side and server-side click tracking links. FIG. 4 also illustrates an example flow of data, shown in states (A) to (F). States (A) to (F) may occur in the illustrated sequence, or they may occur in a sequence that is different than in the illustrated sequence. For example, states (C) and (D) may run concurrently in some implementations.

In general, the system 400 may receive requests for resources, e.g., web pages, from client computing devices and may generate and provide resources including client-side and/or server-side click tracking links to other resources. Upon receiving a resource request, for example, the system 400 may employ various automated and/or developer driven techniques to modify the requested resource to include one or more client-side and/or server-side click tracking links. Requested resources and resources referenced by the requested resources may be analyzed, and links to the referenced resources may be modified to include suitable click tracking techniques, based on the analysis and based on the type of device providing the request.

Client-side click tracking may include asynchronous and synchronous techniques facilitated by decorated attributes, client-side click tracking code, and local storage monitoring code, as described above. Server-side click tracking, for example, may include Uniform Resource Locator (URL) redirection techniques. For example, user interaction, e.g., a link click, may be received for navigating to a referenced resource, the user may be directed to an intermediary resource where the interaction is logged by a server, and the user may be redirected to his or her intended destination, e.g., the referenced resource.

In further detail, the system 400 includes a client computing device 402 and a web server 404 in communication over one or more networks 406. The client computing device 402 can provide to the web server 404 a request 410 for a resource (e.g., "Resource A"), such as a web page. Upon receiving the request 410, for example, the web server 404 can provide a resource 412a ("Resource A") to the client computing device 402 for presentation to a user.

The client computing device 402 may be a smart phone, a tablet computer, a notebook computer, a laptop computer, a desktop computer or any other appropriate portable or stationary computing device. The client computing device 402 may include one or more processors configured to execute instructions stored by a computer-readable medium for performing various client operations, such as input/output, communication, data processing, and the like.

The web server 404 may include one or more servers, e.g., a cloud computing server, a server farm, or another server arrangement including one or more processors configured to execute instructions stored by a computer-readable medium 414 for performing various server operations. In the present example, the web server 404 may be configured to host one or more web sites, to analyze and modify web site pages and to provide pages to users, and to receive and process information associated with user interactions with web pages.

The networks 406 connecting the client computing device 402 and the web server 404 may be wired or wireless, and may include a packet-based network, such as a TCP-IP network. The networks 406 may include a local area network such as an intranet, a wide area network, the Internet, or any appropriate combination thereof.

Referring to the example data flow, during state (A), the web server 404 receives the request 410 for "Resource A" from the client computing device 402 via the networks 406. For example, a user of the client computing device 406 may employ a web browser to navigate to a web page of a web site hosted by the web server 404. As another example, while interacting with the web page, the user of the client computing device 406 may provide one or more parameters or query terms to request a modified instance of the page, e.g., an instance including search results and/or links to other resources.

During state (B), the web server 404 identifies resources that are referenced by the requested resource. For example, the web server 404 can execute computer application code stored by the computer readable medium 404 to analyze "Resource A" (here shown as resource 412b), to identify resources referenced by "Resource A", and to classify the referenced resources. Identified resources may include static or dynamic web pages. For example, the resource 412b may be a static web page including various predefined links to other resources. As another example, the resource 412b may be a dynamic web page such as a search results page, a news feed, or another sort of dynamic web page, including links to other resources determined upon receiving the request 410. The resource 412b ("Resource A") in the present example includes links 420 and 422 to resources 430 ("Resource B") and 432 ("Resource C"), respectively. Each of the resources 430 and 432, for example, may be web page resources maintained and provided by the web server 404 or by other web servers.

During state (C), the web server 404 analyzes the resource 430 ("Resource B") and/or the link 420 to the resource 430. For example, the web server 404 can evaluate the referenced resource 430 ("Resource B") and can evaluate the resource link 420 included in the resource 412b ("Resource A") to identify whether user interaction with the link 420 should be tracked, and to identify one or more suitable tracking mechanisms. Similarly, during state (D), the web server 404 analyzes the resource 432 ("Resource C") and/or the link 422 to the resource 432. For example, the web server 404 can evaluate the referenced resource 432 ("Resource C") and the resource link 422 included in the resource 412b ("Resource A") to identify whether and how user interaction with the link 422 should be tracked.

Various techniques may be employed for determining whether user interaction with a particular link should be tracked and suitable mechanisms to be used for tracking. Developer driven and/or automated techniques may be employed, for example, for determining whether and how click tracking should be used for resource links, and for modifying resources and resource links to include click tracking capabilities. Such techniques may be used individually or in combination, for example.

In some implementations, identifying referenced resources associated with client-side or server-side click tracking may include evaluating links to referenced resources that are included in the requested resource. For example, before generating or modifying the resource 412b ("Resource A") the web server 404 can evaluate the links 420 and 422 to the respective resources 430 ("Resource B") and 432 ("Resource C"). By evaluating the links 420, 422, for example, the web server 404 may identify the respective resources 430, 432 as web page resources, web page control resources (e.g., widgets), or as resources for referencing applications such as dialers or mapping applications that may operate using information provided by the links. Moreover, by evaluating the links 420, 422, for example, the web server 404 may identify resource providers, e.g., web domains, web servers, remote or local applications, etc.

In some implementations, identifying referenced resources associated with client-side or server-side click tracking may include receiving user inputs that identify referenced resources as being associated with client-side click tracking or with server-side click tracking. For example, a developer may identify particular web domains, web servers, web pages, applications, controls, or links as being suitable for asynchronous client-side click tracking, suitable for synchronous client-side click tracking, suitable for server-side click tracking, or as being unsuitable for tracking. In some implementations, a developer may flag a link with an indicator that interaction with the link is to be tracked using a certain technique. For example, the developer may associate one or more flags with the link 422 to indicate that asynchronous client-side click tracking is to be used for tracking user interactions with the link.

In some implementations, one or more whitelists and/or blacklists may be used for identifying resources that may be associated with client-side click tracking. For example, the web server 404 can maintain lists of resources, resource types, and/or resource providers identified by developers or administrators as being suitable or unsuitable for various types of click tracking. In the present example, the web server 404 may reference a whitelist to identify "Resource C" as a resource that supports client-side click tracking, and may reference a blacklist to identify "Resource B" as a resource that does not support client-side click tracking.

In some implementations, identifying referenced resources associated with client-side or server-side click tracking may include identifying one or more servers that are associated with the referenced resources. For example, if a particular resource, e.g., a web page, is identified as being associated with a server that provides pages which support client-side click tracking, a link to the resource may be identified as being a suitable candidate for client-side click tracking. As another example, if the web page resource is identified as being associated with a server that does not provide pages supporting client-side click tracking, the resource link may be identified as being a suitable candidate for server-side click tracking.

Information about servers that provide and that do not provide web pages which support client-side click tracking may be maintained using whitelists and/or blacklists, for example.

In some implementations, identifying referenced resources associated with client-side or server-side click tracking may include navigating to the referenced resources to obtain the content of the referenced resources and evaluating the content. For example, after receiving the request 410 for resource 412b ("Resource A"), the web server 404 can use the link 420 to navigate to the resource 430 ("Resource B"), and can use the link 422 to navigate to the resource 432 ("Resource C"). Upon navigating to the resource 430 ("Resource B"), for example, the web server 404 can obtain and evaluate content 440 and/or links 442 associated with "Resource B". Similarly, upon navigating to the resource 432 ("Resource C"), for example, the web server 404 can obtain and evaluate content 450 and/or links 452 associated with "Resource C".

In general, links to resources including certain types of content may be associated with certain forms of click tracking. For example, a determination may be made regarding whether a particular resource references an application that is local to a device that requests the resource. A web page resource, for example, may include a link to a phone dialer or a mapping application executed by the client device 402. Links to resources referencing applications, for example, may be associated with synchronous client-side click tracking. Links to web page control resources, such as controls that can be used to expand or collapse a web page, for example, may be associated with asynchronous client-side click tracking. Links to resources such as web pages associated with external web sites, for example, may be associated with server-side click tracking.

In some implementations, identifying referenced resources associated with client-side or server-side click tracking may include determining whether each of the referenced resources includes local storage monitoring code. For example, the resource 432 ("Resource C") may include a decorated link 454, client-side click tracking code 456, and local storage monitoring code 458. In the present example, as the link 422 included in the resource 412b ("Resource A") refers to a resource including local storage monitoring code, the link 422 may be associated with client-side click tracking. As the link 420 included in "Resource A" refers to a resource that does not include local storage monitoring code, the link 420 may be associated with server-side click tracking. Instances of the client-side click tracking code 456 and the local storage monitoring code 458 may be provided for suitable web pages associated with a particular server or domain, for example, or for web pages associated with a group of trusted servers or domains.

In some implementations, identifying referenced resources associated with client-side or server-side click tracking may include determining a type of device that requested the resource. Parameters for various device attributes, such as device type (e.g., smartphone, desktop computer, etc.), device model (e.g., particular smartphone models), device applications (e.g., particular web browsers) and device capabilities, such as memory and connection speed capabilities, may be included in resource links and may be used for determining suitable techniques for tracking user interactions with links. For example, if the web server 404 determines that the client computing device 402 requesting "Resource A" is a mobile device (e.g., a smartphone) and that the link 422 to the resource 432 ("Resource C") includes a parameter indicating that interactions with the link 422 are to be associated with client-side click tracking when interacted with by a user employing a mobile device, the web server 404 may associate the link 422 with client-side click tracking. Considering the parameter described in the present example, if the web server 404 were to determine that the client computing device 402 is a different sort of device (e.g., a desktop computer), the web server 404 may associate the link with a different sort of click tracking (e.g., server-side click tracking).

During state (E), the web server 404 modifies the requested resource to include one or more client-side click tracking links and/or one or more server-side click tracking links. Server-side click tracking links, for example, may be generated for links to referenced resources that are associated with server-side click tracking (e.g., "Resource B"). Client-side click tracking links, for example, may be generated for links to referenced resources that are associated with client side click tracking (e.g., "Resource C"). Thus, in the present example, the web server 404 can execute computer application code stored by the computer readable medium 414 to modify "Resource A" (here shown as resource 412c) to include a server-side click tracking link 460 to "Resource B" and a client-side click tracking link 462 to "Resource C".

The resource 412c ("Resource A") in the present example includes client-side click tracking code 466 and local storage monitoring code 468 to facilitate tracking of user interaction with links to resources associated with client-side tracking. Client-side click tracking links (e.g., decorated link 464, client-side click tracking link 462) may be decorated with one or more attributes to enable the client-side click tracking code 466, e.g., code executed by a web browser, to detect and process user interactions with the links. Server-side click tracking links (e.g., server-side click tracking link 460) may include information to facilitate a redirect feature, for example.

During state (F), the web server 404 provides the requested resource 412a ("Resource A") to the client computing device 402 via the networks 406. Upon user interaction with the link 462, for example, the user may be directed to "Resource C", and click tracking information may be provided to the web server 404 by the client device 402. Upon user interaction with the server-side click tracking link 460, for example, the user may be directed to a click-tracking server before directing the user to a server providing "Resource B". Although client-side click tracking links and server-side click tracking links may facilitate different click tracking techniques, in some implementations, such links may appear similar to users. For example, the decorated link 464, the client-side click tracking link 462, and the server-side click tracking link 460 may have graphically similar elements and may be similarly formatted.

Figure 5:
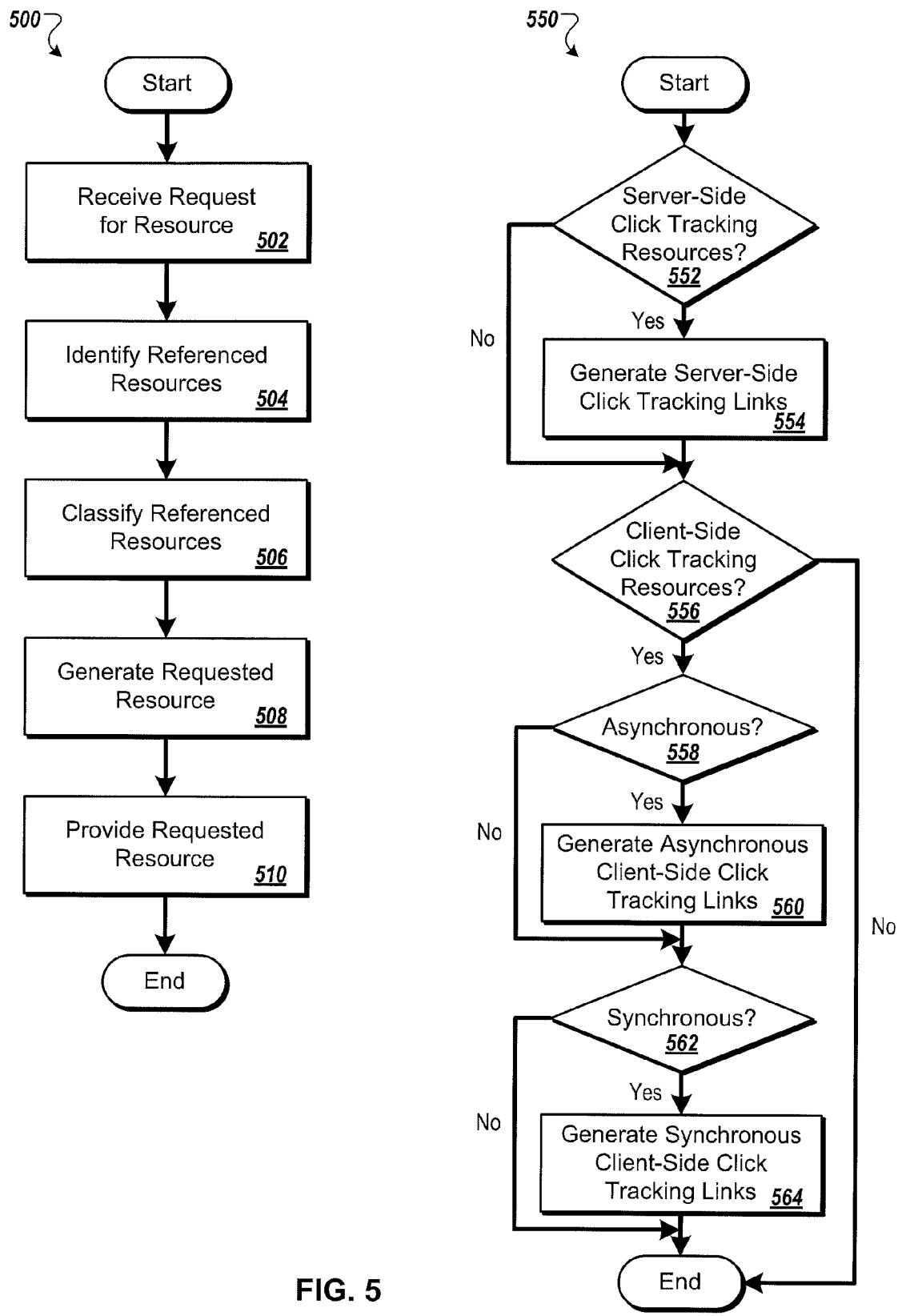
FIG. 5 is a set of flowcharts illustrating example processes for modifying and providing requested resources.

FIG. 5 is a set of flowcharts illustrating example processes 500, 550 for modifying and providing requested resources. Briefly, the process 500 includes receiving a request for a resource, identifying referenced resources, classifying the referenced resources, generating the requested resource, and providing the requesting resource.

In more detail, when the process 500 starts, a request for a resource is received (502). Referring to FIG. 4, for example, the web server 404 can receive the request 410 for "Resource A", e.g., a web page, from the client computing device 402. For example, a user of the client computing device 402 may use a web browser to navigate to a particular web page or to provide information such as a search string to a current web page.

Resources that are referenced by the requested resource are identified (504). For example, upon receiving the request 410 for "Resource A", the web server 404 can identify various resources referenced by "Resource A". Resources referenced by the requested resource may be available from the web server 404, for example, and/or may be available from one or more external web servers. If "Resource A" is a static web page and its referenced resources are provided by the web server 404, for example, the web server 404 can identify referenced resources from data provided by one or more storage devices associated with the server. As another example, if "Resource A" is a dynamic web page, e.g., a search results page, and its referenced resources are provided by one or more web servers other than or in addition to the web server 404, the server 404 can identify referenced resources from data previously gathered during web crawling sessions and/or from data retrieved upon receiving the request.

The referenced resources are classified (506). For example, the web server 404 can classify each of the resources "Resource B" and "Resource C" referenced by "Resource A". As discussed above in regard to FIG. 4, various techniques may be used for classifying resources, such as evaluating links to referenced resources, evaluating content and/or links included in the resources, identifying servers associated with the resources, determining whether referenced resources include local storage monitoring code, receiving user input, and comparing resources, resource servers, and/or resource content against whitelists, and/or blacklists. Resource classification, for example, may include such techniques individually or in combination. By classifying resources, for example, the web server 404 may determine whether a link is suitable for click-tracking techniques such as asynchronous client-side click tracking, synchronous client-side click tracking, or server-side click tracking.

The requested resource is generated (508). For example, the web server 404 can generate "Resource A" (here shown as resource 412c). To generate resources, for example, resources may be modified to include one or more client-side click tracking links to referenced resources that are associated with client-side click tracking, and to include one or more server-side click tracking links to referenced resources that are associated with server-side click tracking. In the present example, "Resource A" includes a server-side click tracking link 460 to "Resource B" and a client-side click tracking link 462 to "Resource C". By including reference links that use different sorts of click tracking techniques within a resource, and by generating the resource upon user request, for example, suitable click tracking techniques may be determined and implemented dynamically.

The requested resource is provided (510). For example, the web server 404 can provide "Resource A" (here shown as resource 412a) to the client computing device 402 via the networks 406. Upon receiving "Resource A", for example, the client computing device 402 can present information associated with the resource 412a to the user, and can provide information related to user interactions, e.g., link clicks, with the resource 412a to the web server 404.

The process 550 illustrates an example process for generating click-tracking links for a requested resource. For example, the process 550 may be performed as part of performing step 508, i.e., generating the requested resource, of the process 500.

When the process 550 starts, a determination (552) is made of whether the requested resource refers to one or more resources suitable for server-side click tracking. If so, server-side click tracking links may be generated (554). The server-side click tracking links, for example, may include information to facilitate redirection, such as Uniform Resource Locator (URL) information. Upon generating the server-side click tracking links, or in the case of a requested resource that does not refer to resources suitable for server-side click tracking, the process 550 continues.

A determination (556) is made of whether the requested resource refers to one or more resources suitable for client-side click tracking. If so, the process proceeds. If not, the process ends. For referenced resources that are suitable for client-side click tracking, synchronous or asynchronous client-side click tracking may be employed. Asynchronous client-side click tracking, for example, may include accumulating and periodically reporting information associated with user interaction with resource links. Synchronous client-side click tracking, for example, may include reporting information associated with link interaction upon detecting the interaction, e.g., before navigating away to a resource associated with the link or before executing an application referenced by the resource.

A determination (558) is made of whether the requested resource refers to one or more resources suitable for asynchronous client-side click tracking. If so, asynchronous client-side click tracking links may be generated (560). For example, links to the referenced resources may be decorated with one or more attributes or flags, such as numeric and/or enumerated values, for specifying that user interaction with the resource links should be asynchronously tracked by a client. A registered event handler of a web browser executed by the client, for example, may appropriately handle user interactions with the decorated links. Upon generating the asynchronous client-side click tracking links, or in the case of a requested resource that does not refer to resources suitable for asynchronous client-side click tracking, the process 550 continues.

A determination (562) is made of whether the requested resource refers to one or more resources suitable for synchronous client-side click tracking. If so, synchronous client-side click tracking links may be generated (564). Similar to asynchronous client-side click tracking links, for example, links to the referenced resources may be decorated with one or more attributes, such as numeric and/or enumerated values or flags, for specifying that user interaction with the resource links should be synchronously tracked by a client. Upon generating the synchronous client-side click tracking links, or in the case of a requested resource that does not refer to resources suitable for synchronous client-side click tracking, the process 550 ends.

Figure 6:
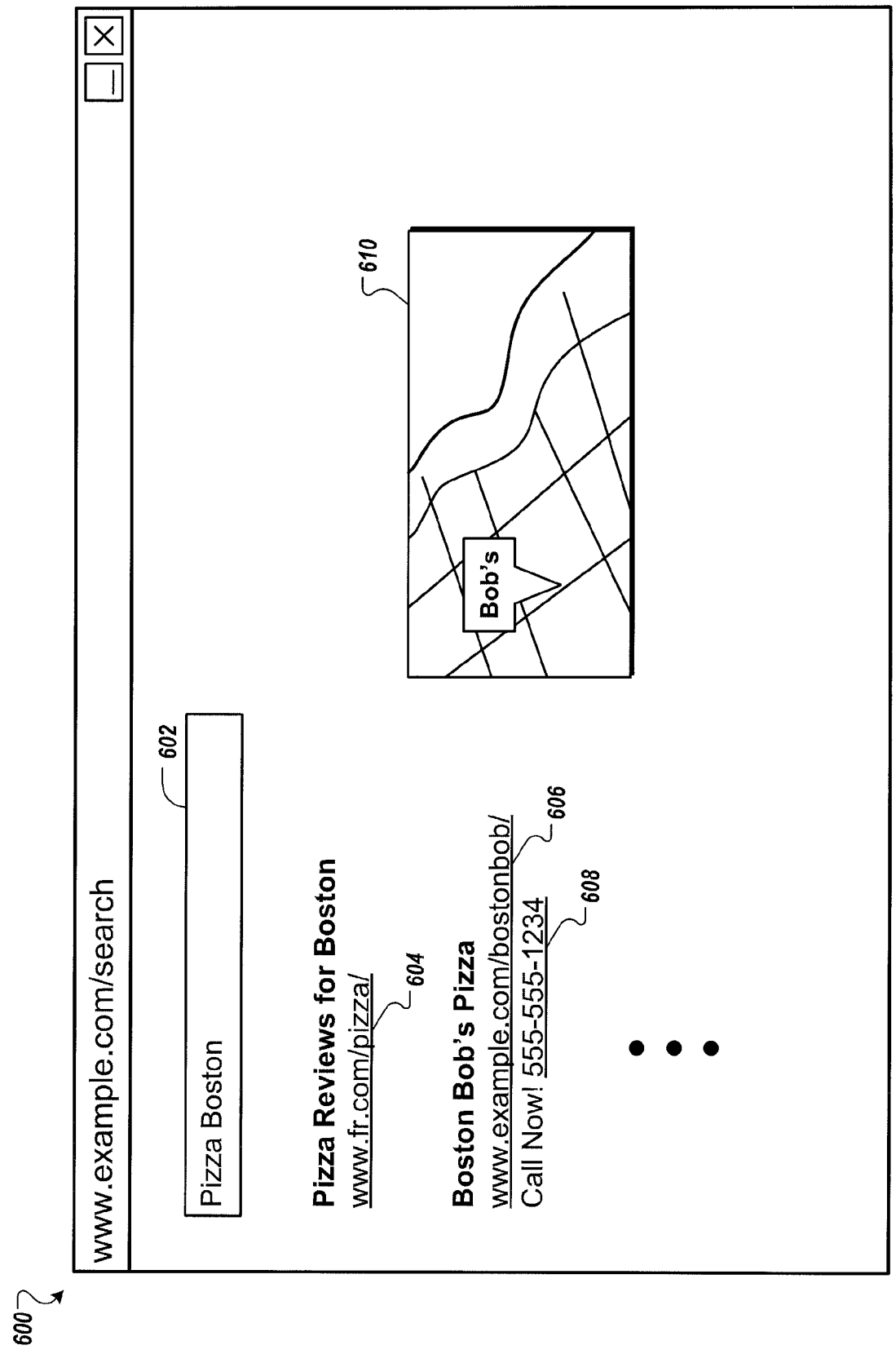
FIG. 6 is an illustration of an example interface including various types of click tracking links.

FIG. 6 is an illustration of an example interface 600 including various types of click tracking links. For example, the interface 600 may be used to present resource information to users via a client computing device, such as the client computing device 402 (shown in FIG. 4). Moreover, the interface 600 may be employed by the user to submit resource requests, such as the request 410 (also shown in FIG. 4).

The interface 600 includes a control 602 for providing a search query to a search engine. In the present example, a user interacts with the control 602 to provide, e.g., by typing, speaking, etc., the search query "Pizza Boston" to a search engine at the web address "www.example.com/search". Upon receiving the search query, for example, the search engine may identify resources that are referenced by the requested resource, may generate client-side and/or server-side click tracking links referring to the identified resources, and may provide a search results page including the links.

One or more of the referenced resources may be associated with server-side click tracking links. In the present example, link 604 refers to a resource which aggregates pizza reviews for various Boston restaurants. The search engine, for example, can identify the server associated with the referenced resource (e.g., "www.fr.com/pizza/"), and can determine that the server is of a different domain than the domain of the search engine (e.g., www.example.com). Moreover, in the present example, the search engine may identify that the server associated with "www.fr.com/pizza/" does not provide web pages including client-side click-tracking code and local storage monitoring code. Thus, the search engine may determine that user interaction with the link 604 may suitably be tracked using server-side click tracking techniques.

The search engine, for example, can generate the link 604, i.e., a server-side click tracking link, and can provide the link 604 to the user. When the user interacts with the link 604, for example, the search engine server may direct the user to a click tracking server before redirecting the user to "www.fr.com/pizza/".

One or more of the referenced resources may be associated with asynchronous client-side click tracking links. In the present example, link 606 refers to a resource which provides information about "Boston Bob's Pizza". The search engine, for example, can identify the server associated with the referenced resource (e.g., "www.example.com/bostonbob/"), and can determine that the server is of the same domain as the domain of the search engine (e.g., www.example.com). Moreover, in the present example, client-side click tracking code and local storage monitoring code may be provided for web pages of the domain. Thus, the search engine may determine that user interaction with the link 606 may suitably be tracked using asynchronous client-side click tracking techniques.

The search engine, for example, can generate the link 606, i.e., an asynchronous client-side click tracking link, and can provide the link 606 to the user. When the user interacts with the link 606, for example, application code executed by the user's web browser may locally store information associated with the interaction. The interaction information may be provided to the search engine or to another server which aggregates click tracking information, subsequent to the storage of the information. For example, providing the information may be based on a timer event, and may occur as the web browser navigates to the landing page (e.g., "www.example.com/bostonbob/"), upon arrival at the landing page, or while the user interacts with the landing page. Thus, in the present example, information about the navigation may be tracked without delaying user navigation from the search results page to the landing page.

One or more of the referenced resources may be associated with synchronous client-side click tracking links. In the present example, links 608 and 610 refer to applications local to the user's device. The link 608, for example, includes phone number information for "Boston Bob's Pizza" to be provided to a dialer application. The link 610, for example, includes mapping information, e.g., an address, for "Boston Bob's Pizza" to be provided to a mapping application. As the links 608 and 610 refer to local device applications, for example, the search engine may determine that user interaction with the links 608, 610 may suitably be tracked using synchronous client-side click tracking techniques.

The search engine, for example, can generate the links 608 and 610, i.e., synchronous client-side click tracking links, and can provide the links 608 and 610 to the user. Upon detecting user interaction with the link 608, for example, the web browser can launch a dialer application local to the user's device, and can provide the phone number information (e.g., "555-555-1234") to the dialer. Upon detecting user interaction with the link 610, for example, the web browser can launch a mapping application local to the user's device, and can provide the mapping information (e.g., an address for "Boston Bob's Pizza") to the mapping application. Interaction information may be provided to the search engine or to another server which aggregates click tracking information, for example, prior to launching an application associated with a link. Thus, as a user switches from using a web browser to using another sort of application, click tracking information stored by a client can be provided to a server before exiting the browser session, thereby ensuring that such information is not lost.

Figure 7:
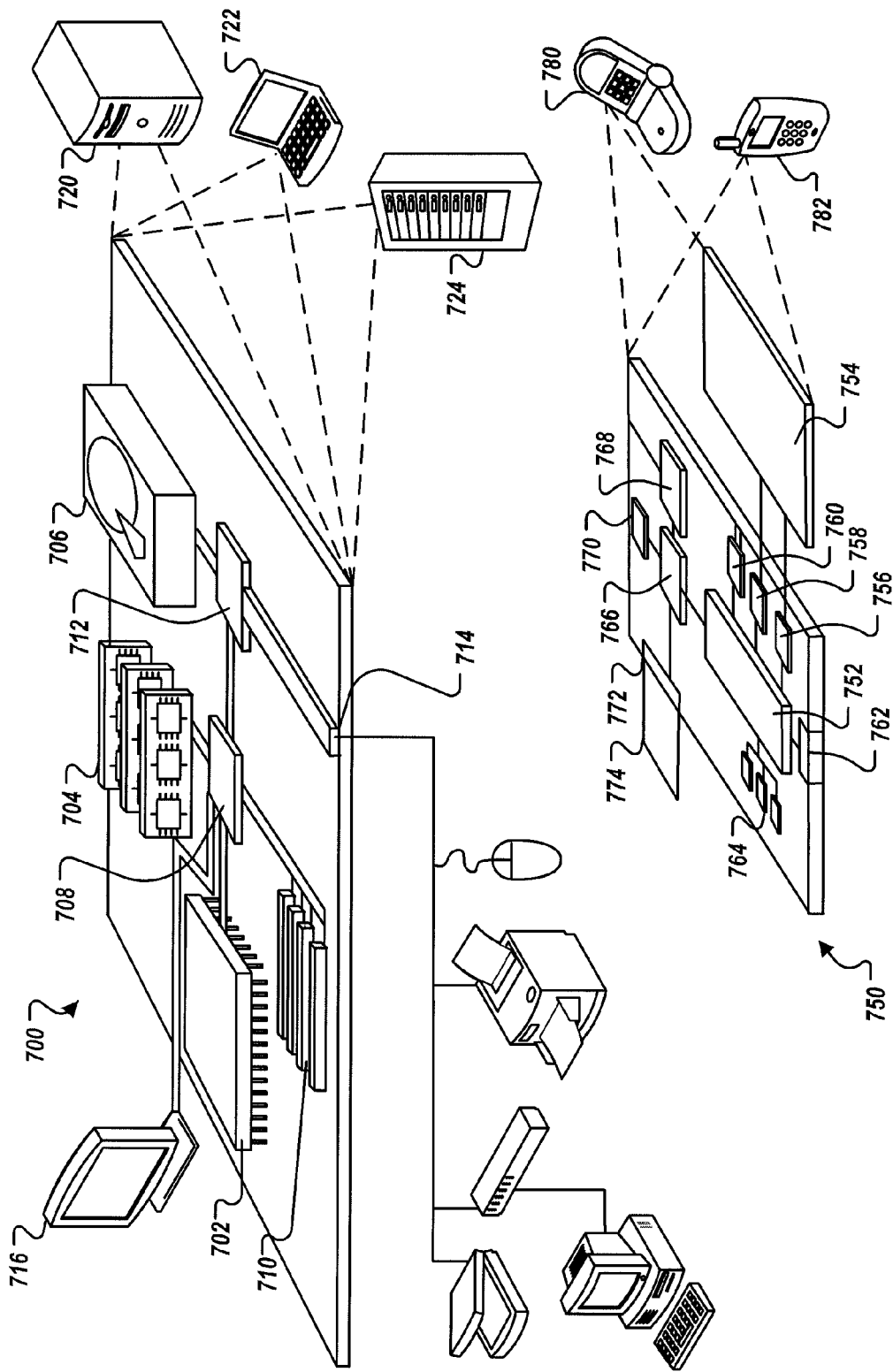
FIG. 7 shows an example of a generic computer device and a generic mobile computer device.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations, e.g., as a server bank, a group of blade servers, or a multi-processor system.

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716, e.g., through a graphics processor or accelerator, and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by one or more servers and from a client device, a request for a document;
   identifying, by at least one of the one or more servers, multiple resources to which the requested resource is to be linked;
   selecting, for each of the identified multiple resources, a tracking option from among a set of tracking options that includes at least asynchronous client-side tracking and synchronous server-side tracking;
   generating the requested resource to include:
      one or more asynchronous client-side tracking links for one or more resources for which asynchronous client-side tracking was selected, wherein each client-side tracking link includes code that causes the client device to generate data indicating a selection of the link, and to transmit the generated data to a server asynchronous with the selection,
      local storage monitoring code configured to cause the client device to (i) accumulate tracking data for multiple selections of the one or more asynchronous client-side tracking links, (ii) detect a predetermined trigger, and (iii) send the accumulated tracking data to one or more servers in response to detecting the predetermined trigger, and
      one or more synchronous server-side tracking links for one or more resources for which synchronous server-side tracking was selected, wherein each server-side tracking link includes code that causes a server to generate data indicating a selection of the link, synchronous with the selection; and
   providing the generated document to the client device in response to the request.

2. The method of claim 1, wherein generating the requested resource comprises generating the requested resource to include local storage monitoring code that is configured to cause the client device to:
   detect selection of a link to a resource in an Internet domain different from an Internet domain of the document; and
   send the accumulated tracking data to one or more servers in response to detecting selection of the link to the resource in the Internet domain different from the Internet domain of the document.

3. The method of claim 2, wherein selecting a tracking option for each of the identified multiple resources comprises:
   selecting asynchronous client-side tracking for one or more of the identified multiple resources that are in the same Internet domain as the document; and
   selecting synchronous server-side tracking for one or more of the identified multiple resources that are in an Internet domain different from the Internet domain as the document.

4. The method of claim 1, wherein the local storage monitoring code is configured to send the accumulated tracking data to one or more servers in response to detecting that the user selected one of the synchronous server-side tracking links.

5. The method of claim 1, wherein generating the requested resource comprises generating the requested resource to include local storage monitoring code that is configured to cause the client device to:
   detect that a predetermined time period has ended; and
   send the accumulated tracking data to one or more servers in response to detecting the that the predetermined time period has ended.

6. The method of claim 1, wherein the local storage monitoring code is configured to periodically send accumulated tracking data to one or more servers based on a timer.

7. The method of claim 1, wherein receiving the request for the document comprises receiving a request for a search results page, the request comprising a search query;
   wherein identifying multiple resources to which the requested document is to be linked comprises identifying resources responsive to the search query;
   wherein selecting the tracking option for each of the identified multiple resources comprises selecting, for each of multiple resources responsive to the search query, a tracking option for a link to the resource in a search result in the requested search results page; and
   generating the document comprises generating the search results page, wherein one or more of the search results include an asynchronous client-side tracking link and one or more of the search results include a synchronous server-side tracking link.

8. The method of claim 1, wherein selecting, for each of the identified multiple resources, a tracking option from among a set of tracking options comprises dynamically selecting the tracking options for the respective resources in response to receiving the request for the document.

9. The method of claim 1, wherein selecting, for each of the identified multiple resources, a tracking option from among a set of tracking options comprises:
determining, for each of the identified multiple resources, whether the resource is associated with a particular domain or a particular server;
based on determining that a first resource of the multiple resources is associated with the particular domain or the particular server, selecting asynchronous client-side tracking for a link to the first resource; and
based on determining that a second resource of the multiple resources is not associated with the particular domain or the particular server, selecting synchronous server-side tracking for a link to the second resource.

10. The method of claim 1, wherein the local storage monitoring code is configured to send the accumulated tracking data to the one or more servers in response to detecting an action, at the client device, to initiate navigation away from the document or from an Internet domain associated with the document.

11. The method of claim 1, wherein selecting, for each of the identified multiple resources, a tracking option from among a set of tracking options comprises:
accessing stored data that designates tracking options for resources, resource types, servers, or Internet domains, the stored data being generated prior to receiving the request for the document; and
selecting tracking options for the identified multiple resources according to the designations in the stored data.

12. The method of claim 1, wherein selecting the tracking options for the identified multiple resources comprises:
identifying one or more of the identified multiple resources that are included on (i) a client-side click tracking whitelist that indicates one or more resources designated for tracking using client-side click tracking or (ii) a client-side click tracking blacklist that indicates resources to exclude from client-side click tracking.

13. The method of claim 1, wherein selecting the tracking options for the identified multiple resources comprises:
evaluating links that are included in the requested resource; and
determining whether one or more of the identified multiple resources should be associated with client-side click tracking or server-side click tracking based on evaluating the links that are included in the requested resource.

14. The method of claim 1, wherein selecting the tracking options for the identified multiple resources comprises:
identifying one or more servers that are associated with the identified multiple resources; and
determining whether one or more of the identified multiple resources should be associated with client-side click tracking or server-side click tracking based on the identified one or more servers.

15. The method of claim 1, wherein selecting the tracking options for the identified multiple resources comprises:
receiving one or more user inputs that identify one or more of the identified multiple resources as resources that are to be associated with client-side click tracking, or as resources that are to be associated with server-side click tracking.

16. The method of claim 1, wherein selecting the tracking options for the identified multiple resources comprises:
determining whether a particular resource of the identified multiple resources includes local storage monitoring code configured to cause tracking data to be stored locally at a client device; and
determining whether the particular resource should be associated with client-side click tracking or server-side click tracking based on whether the particular resource includes local storage monitoring code configured to cause tracking data to be stored locally at a client device.

17. The method of claim 1, further comprising determining a type of the client device that requested the resource;
wherein selecting the tracking options for the identified multiple resources comprises:
selecting between asynchronous client-side tracking and synchronous server-side tracking for one or more of the identified multiple resources based on the type of the client device that requested the resource.

18. The method of claim 1, wherein selecting the tracking options for the identified multiple resources comprises:
after receiving the request for the document, navigating to a particular resource of the identified multiple resources to obtain the content of the particular resource;
evaluating the content of the particular resource; and
determining whether to track a link to the particular resource using asynchronous client-side tracking or synchronous server-side tracking asynchronous client-side tracking and synchronous server-side tracking.

19. The method of claim 1, wherein selecting the tracking options for the identified multiple resources comprises:
for each of the identified multiple resources, determining whether the resource references an application that is local to the client device that is requesting the resource.

20. The method of claim 1, wherein the set of tracking options further includes synchronous client-side tracking;
wherein generating the requested resource comprises generating the requested resource to further include one or more synchronous client-side tracking links for one or more resources for which synchronous client-side tracking was selected, wherein each synchronous client-side tracking link includes code that causes the client device to generate tracking data indicating a selection of the link, and to transmit the generated data to a server synchronous with the selection.

21. The method of claim 20, wherein links to each of the identified multiple resources that are associated with client-side click tracking each include a flag that specifies whether the corresponding resource is associated with synchronous client-side tracking or asynchronous client-side tracking.

22. A system comprising:
one or more computers and one or more storage devices storing instructions that are operable, when executed by the one or more computers, to cause the one or more computers to perform operations comprising:
receiving, by one or more servers and from a client device, a request for a document;
identifying, by at least one of the one or more servers, multiple resources to which the requested document is to be linked;
selecting, for each of the identified multiple resources, a tracking option from among a set of tracking options that includes at least asynchronous client-side tracking and synchronous server-side tracking;
generating the requested resource to include:
one or more asynchronous client-side tracking links for one or more resources for which asynchronous client-side tracking was selected, wherein each asynchronous client-side tracking link includes code that causes the client device to generate tracking data indicating a selection of the link, and to transmit the generated data to a server asynchronous with the selection, local storage monitoring code configured to cause the client device to (i) accumulate tracking data for multiple selections of the one or more asynchronous client-side tracking links, (ii) detect a predetermined trigger, and (iii) send the accumulated tracking data to one or more servers in response to detecting the predetermined trigger, and one or more synchronous server-side tracking links for one or more resources for which synchronous server-side tracking was selected, wherein each synchronous server-side tracking link includes code that causes a server to generate data indicating a selection of the link, synchronous with the selection; and providing the generated document to the client device in response to the request.

23. The system of claim 22, wherein generating the requested resource comprises generating the requested resource to include local storage monitoring code that is configured to cause the client device to:

detect selection of a link to a resource in an Internet domain different from an Internet domain of the document; and send the accumulated tracking data to one or more servers in response to detecting selection of the link to the resource in the Internet domain different from the Internet domain of the document.

24. The system of claim 22, wherein selecting a tracking option for each of the identified multiple resources comprises:

selecting asynchronous client-side tracking for one or more of the identified multiple resources that are in the same Internet domain as the document; and selecting synchronous server-side tracking for one or more of the identified multiple resources that are in an Internet domain different from the Internet domain as the document.

25. The system of claim 22, wherein the local storage monitoring code is configured to send the accumulated tracking data to one or more servers in response to detecting that the user selected one of the synchronous server-side tracking links.

26. The system of claim 22, wherein generating the requested resource comprises generating the requested resource to include local storage monitoring code that is configured to cause the client device to:

detect that a predetermined time period has ended; and send the accumulated tracking data to one or more servers in response to detecting the that the predetermined time period has ended.

27. The system of claim 22, wherein the local storage monitoring code is configured to periodically send accumulated tracking data to one or more servers based on a timer.

28. The system of claim 22, wherein receiving the request for the document comprises receiving a request for a search results page, the request comprising a search query;

wherein identifying multiple resources to which the requested document is to be linked comprises identifying resources responsive to the search query;

wherein selecting the tracking option for each of the identified multiple resources comprises selecting, for each of multiple resources responsive to the search query, a tracking option for a link to the resource in a search result in the requested search results page; and generating the document comprises generating the search results page, wherein one or more of the search results include an asynchronous client-side tracking link and one or more of the search results include a synchronous server-side tracking link.

29. A non-transitory computer-readable medium storing software comprising instructions executable by one or more computers which, upon such execution, cause the one or more computers to perform operations comprising:

receiving, by one or more servers and from a client device, a request for a document;

identifying, by at least one of the one or more servers, multiple resources to which the requested document is to be linked;

selecting, for each of the identified multiple resources, a tracking option from among a set of tracking options that includes at least asynchronous client-side tracking and synchronous server-side tracking;

generating the requested resource to include:

one or more asynchronous client-side tracking links for one or more resources for which asynchronous client-side tracking was selected, wherein each asynchronous client-side tracking link includes code that causes the client device to generate tracking data indicating a selection of the link, and to transmit the generated data to a server asynchronous with the selection, local storage monitoring code configured to cause the client device to (i) accumulate tracking data for multiple selections of the one or more asynchronous client-side tracking links, (ii) detect a predetermined trigger, and (iii) send the accumulated tracking data to one or more servers in response to detecting the predetermined trigger, and one or more synchronous server-side tracking links for one or more resources for which synchronous server-side tracking was selected, wherein each synchronous server-side tracking link includes code that causes a server to generate data indicating a selection of the link, synchronous with the selection; and providing the generated document to the client device in response to the request.

30. The non-transitory computer-readable medium of claim 29, wherein generating the requested resource comprises generating the requested resource to include local storage monitoring code that is configured to cause the client device to:

detect selection of a link to a resource in an Internet domain different from an Internet domain of the document; and send the accumulated tracking data to one or more servers in response to detecting selection of the link to the resource in the Internet domain different from the Internet domain of the document.

31. The non-transitory computer-readable medium of claim 29, wherein selecting a tracking option for each of the identified multiple resources comprises:

selecting asynchronous client-side tracking for one or more of the identified multiple resources that are in the same Internet domain as the document; and selecting synchronous server-side tracking for one or more of the identified multiple resources that are in an Internet domain different from the Internet domain as the document.

32. The non-transitory computer-readable medium of claim 29, wherein the local storage monitoring code is configured to send the accumulated tracking data to one or more servers in response to detecting that the user selected one of the synchronous server-side tracking links.

33. The non-transitory computer-readable medium of claim 29, wherein generating the requested resource comprises generating the requested resource to include local storage monitoring code that is configured to cause the client device to:
- detect that a predetermined time period has ended; and
- send the accumulated tracking data to one or more servers in response to detecting the that the predetermined time period has ended.

34. The non-transitory computer-readable medium of claim 29, wherein the local storage monitoring code is configured to periodically send accumulated tracking data to one or more servers based on a timer.

35. The non-transitory computer-readable medium of claim 29, wherein receiving the request for the document comprises receiving a request for a search results page, the request comprising a search query;
- wherein identifying multiple resources to which the requested document is to be linked comprises identifying resources responsive to the search query;
- wherein selecting the tracking option for each of the identified multiple resources comprises selecting, for each of multiple resources responsive to the search query, a tracking option for a link to the resource in a search result in the requested search results page; and
- generating the document comprises generating the search results page, wherein one or more of the search results include an asynchronous client-side tracking link and one or more of the search results include a synchronous server-side tracking link.

* * * * *